(12) United States Patent
Kiser et al.

(10) Patent No.: US 6,179,926 B1
(45) Date of Patent: Jan. 30, 2001

(54) PROCESS FOR STEEPING CORN AND STEEPWATER HAVING A LOW REDUCING SUGAR CONTENT MADE THEREFROM

(75) Inventors: Ricky D. Kiser, Germanton, NC (US); Ling Du, Bolingbrook, IL (US)

(73) Assignee: Corn Products International, Inc., Bedford Park, IL (US)

( * ) Notice: Under 35 U.S.C. 154(b), the term of this patent shall be extended for 0 days.

(21) Appl. No.: 09/290,099

(22) Filed: Apr. 12, 1999

(51) Int. Cl.$^7$ .................................................. C08B 30/00
(52) U.S. Cl. ................................................................ 127/68
(58) Field of Search ........................................... 127/68

(56) References Cited

U.S. PATENT DOCUMENTS

| | | |
|---|---|---|
| Re. 18,775 | 3/1933 | Sherman . |
| 58,824 | 10/1866 | Hirsh . |
| 1,655,395 | 1/1928 | Moffett . |
| 1,960,985 | 5/1934 | Acton . |
| 2,088,706 | 8/1937 | Jefferies . |
| 2,232,555 | 2/1941 | Musher . |
| 2,776,228 | 1/1957 | Snyder . |
| 4,086,135 | 4/1978 | Balana . |
| 4,129,665 | 12/1978 | Clark . |
| 4,359,528 | 11/1982 | Devos . |
| 4,980,282 | 12/1990 | de Troostembergh . |

*Primary Examiner*—David Brunsman
(74) *Attorney, Agent, or Firm*—Norris, McLaughlin & Marcus

(57) ABSTRACT

A corn steeping process wherein the pH is adjusted to from about 4.2 to about 5.5 at a time between about 4 hours after fresh steepwater is introduced to about 1 hour before the separation of the steepwater from the corn. The process provides a steepwater having a low reducing sugar content while also providing good starch yields.

8 Claims, 5 Drawing Sheets

% Reducing Sugars in Incubation tank before pH adjustment in steeps

PROCESS FOR STEEPING CORN AND STEEPWATER HAVING A LOW REDUCING SUGAR CONTENT MADE THEREFROM

BACKGROUND OF THE INVENTION

1. Field of the Invention

The present invention relates to an improvement in the wet milling process for separating and recovering products from corn. More particularly, the present invention relates to an improved steeping process which results in improved millability giving higher yields of starch and in a steepwater having a low reducing sugar content.

2. Description of the Related Art

In the usual processing of corn, the whole corn is steeped in water containing sulfur dioxide at an elevated temperature and acid pH for an extended period of time. During the course of the soaking, the soluble substances are extracted from the corn grain to the soaking water where they ferment due to the presence of lactic acid bacteria in the water. Variables such as soaking time, $SO_2$ levels, water removal rates, temperatures, etc. are used to promote separation. The resulting steepwater is used as a fermentation medium to produce a wide variety of products such as enzymes, pharmaceuticals, etc. Due to the many variations in the process, the quality of corn steepwater found in the market varies widely.

An early description of a simple steeping process is described in U.S. Pat. No. Re. 18,775 where acidulated water is added to a single steep tank. Following separation of the starch, the water is re-used in the process. Other early descriptions of steeping processes involving the recycling of the steepwater back to the process are found in U.S. Pat. Nos. 58,824; 1,655,395; and 1,960,985.

U.S. Pat. No. 2,232,555 describes a process in which corn is soaked in acidified water having a pH of 4.5 to 6.9 at a temperature of 125° F. to 145° F. for about 5 to 15 hours to provide an extract containing substantial quantities of water soluble carbohydrates or sugars.

U.S. Pat. No. 4,359,528 describes a process for producing steepwater having a high amino acid content and useful in the production of penicillin. The process utilizes decreasing temperatures over a series of silos and high cycling ratios of water to corn. A pH of 3.95 to 4.2 is reported.

U.S. Pat. No. 4,980,282 describes a process in which the steepwater is separated from the process, incubated to develop a biomass and the developed biomass treated at a temperature between 40° C. to about 48° C. at a pH of at least about 3.5.

While producing steepwater of varying degrees of usefulness, a process has now been found that provides a steepwater having the low reducing sugar content necessary for use as a fermentation medium while providing high yields of starch.

SUMMARY OF THE INVENTION

According to this invention there is provided a process for producing corn steepwater comprising (a) introducing fresh steepwater containing from about 1000 to about 2200 parts per million sulfur dioxide to corn;

(b) steeping the corn for a steeping time greater than 10 hours at a temperature from about 118° F. to about 125° F.;

(c) separating the steepwater from the corn at a rate of 2 to 4 gallons per bushel of corn;

(d) adjusting the pH to from about 4.2 to about 5.5 at a time between about 4 hours after the fresh steepwater is introduced to about 1 hour before the separation of the steepwater from the corn;

(e) maintaining the separated steepwater at a temperature from about 118° F. to about 125° F. for between about 10 to about 40 hours; and (f) evaporating the corn steepwater.

BRIEF DESCRIPTION OF THE DRAWINGS

For a fuller understanding of the invention, reference should be had to the following detailed description taken in connection with the accompanying drawings, in which.

DETAILED DESCRIPTION OF THE INVENTION

Figure 1:
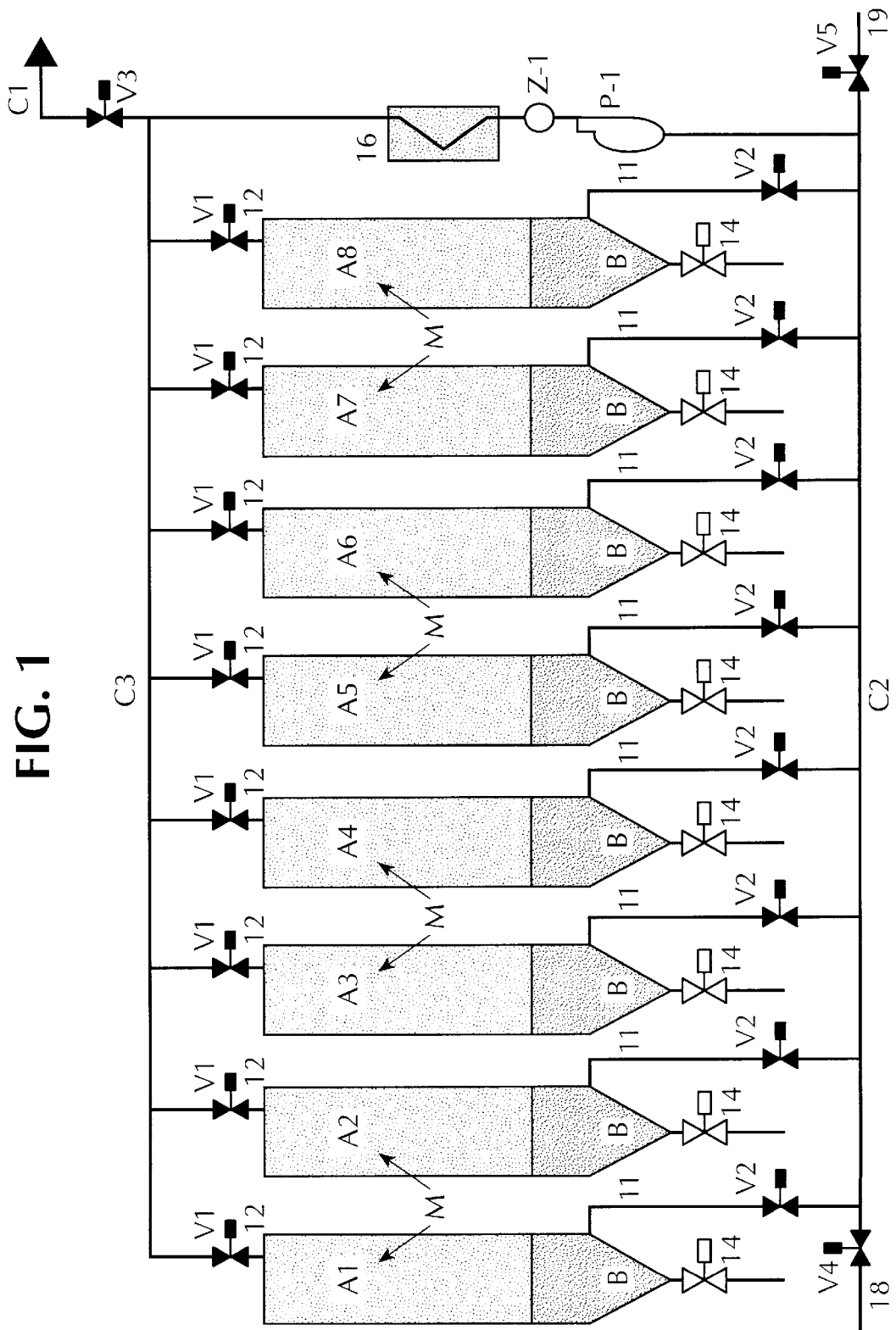
FIG. 1 is a diagrammatic side elevation view of a battery of silos used in a corn steeping process.

In carrying out the process, corn grains, placed in silos, are contacted with steepwater containing from about 1000 to about 2200 parts per million sulfur dioxide to corn. The corn is steeped for greater than 10 hours and preferably between about 20 to about 48 hours at a temperature from about 118° F. to about 125° F. Steeping can be carried out in a batch process or in series as shown in FIG. 1. When carried out in series, fresh steepwater is introduced successively into each of the silos in the series.

In a normal steeping process, the pH is 3.8 to 4.1. It has been found in the process of this invention that adjusting the pH to from about 4.2 to about 5.5 at a time between about 4 hours after the fresh steepwater is introduced initially to about 1 hour before the separation of the steepwater from the corn followed by maintaining the separated steepwater at a temperature from about 118° F. to about 125° F. for between about 10 to about 40 hours provides a steepwater having low reducing sugar content. This characteristic renders the steepwater commercially attractive. Moreover, the yields of starch are high, providing another advantage in that starch yields frequently suffer when fermentation quality steepwater is produced. Finally, the steepwater is evaporated to provide a commercial product.

In preferred embodiments of this invention, the pH is adjusted at a time between about 8 hours and about 16 hours after the fresh steepwater is introduced.

While the pH adjustment can be carried out in the course of the steepwater process, in another embodiment of the invention the steepwater can be withdrawn from the process, the pH adjusted, and the steepwater returned to the process.

The following Examples will serve to illustrate the practice of this invention.

EXAMPLE 1

Steeping of clean yellow dent no. 2 corn was carried out in an industrial plant at different conditions as described below in two identical sets of steeps silos (A and B battery). One of these batterys is shown in FIG. 1 and comprises Eight silos A1 to A8 of stainless steel with a filtering base B, of 67,800 gallons total volume and each diameter equal to 18' equipped with:

a piping 11 connecting the base of a given silo to the head of the silo itself, and to the heads of the other seven silos via a common drain pipe C2 and a common fill pipe C3 ensuring the recycling of the water into the silo itself or to any other silo, this piping also serving to withdraw the soaking water at a given time to a holding tank (not shown) through common pipelines shown in FIG. 1, a bottom valve 14 for emptying the corn, a tube and shell heat exchanger 16 with a circulating pump P-1 which controls the liquid flow through the heating tubes in heat exchanger 16 to the head of any other silo, eight solenoid operated water drain valves V2 placed on pipeline 11 to segregate each silo from the common drain line C2 allowing water movement throughout the battery, eight solenoid operated water fill valves V1 placed on pipeline 12 to segregate each silo from the common fill line C3 allowing water movement throughout the battery, an outlet pipe C1 and valve V3 connecting to an incubation tank (not shown) that receives a batch draw of 2–4 gallons of water per bushel of corn ground with a capacity large enough to provide 24–40 hours of incubation time, connected to each silo through pipes C2 and 11, with valves V2 ensuring the segregation of water between the silos, an inlet pipe 19 for $SO_2$ water, adjusted to 1000–2200 ppm, from which the S02 water is added as a batch by opening valve V5 and V1, replacing drawn water, an inlet pipe 18 for alkali addition, to adjust pH in a range 4.2–5.5, from which the alkali is added into C2 by opening V4 $V_2$ and $V_1$ of the same silo, and starting pump P-1; this allows pH adjustments of water in any silo during any part of the steeping cycle, pH meter Z-1 for measuring the pH of the water; Z-1 closes V-4 when pH reaches the desired set point.

The silos are filled with corn M and process water is moved countercurrently through the steep silos with the oldest corn contacting the newest water. In the system the corn does not move from steep silo to steep silo; only the water is advanced between silos. After 24 to 40 hours of incubation, the steepwater is moved to an evaporator (not shown) and is evaporated to 50% dry matter under a vacuum, at a temperature below 85° C.

The two identical sets of silos were operated at steeping temperatures of 118° F.–125° F., $SO_2$ concentrations of 1000 to 2200 ppm and steepwater draw rates of 2.0 to 4.0 gallons per bushel. B-battery was the control sample and A-battery was pH adjusted during steeping at designated times. A 100-gram sample of clean yellow dent no 2 corn was sealed in a 1.2" by 1.2" cheesecloth and placed into each silo in each battery after the silo is filled with corn. The corn samples in the cheesecloth were exposed to steep conditions identical to the corn steeped in each battery. After designated times during the steeping cycle, samples were pulled from each battery, coded to stop further steeping, and tested for millibility according to the procedure described in Chem. 70:732–727.

The steepwater pH was adjusted to 4.6 in A-battery at various points during the steeping cyde as indicated in Table I while B-battery was maintained at normal pH conditions of 3.8 to 4.1 pH. This adjustment was made with the addition of 30% aqueous NaOH. The point in the steeping cycle where the pH was adjusted varied from 8 hours after the $SO_2$ water is introduced to the steeping process through inlet pipe 18 to 1 hour before the final steepwater draw.

Figure 2:
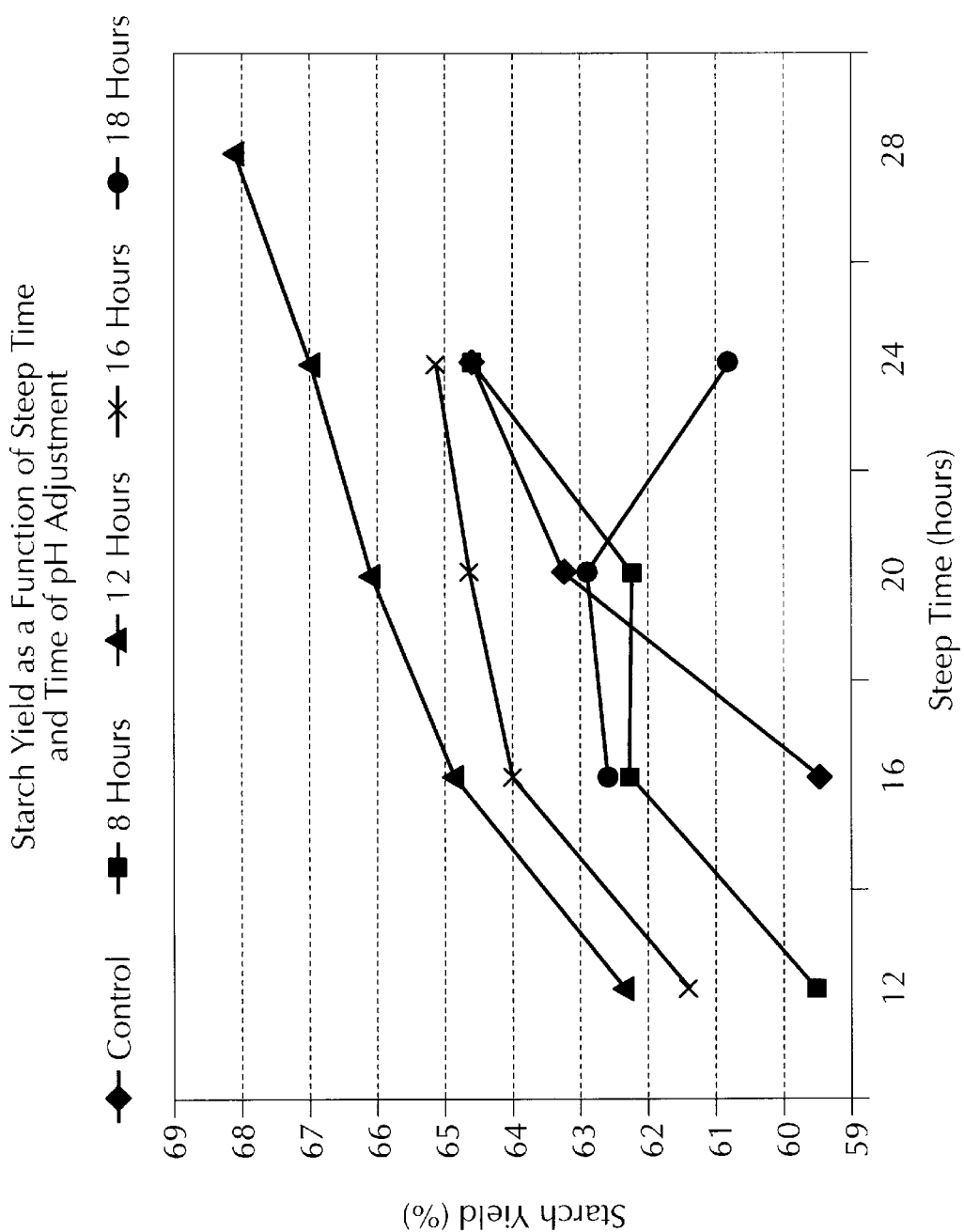
FIG. 2 is a chart showing starch yield as a function of steep time and time of pH adjustment.

Table I shows the results for comparisons of starch yields between the B-battery control samples and A-battery samples at various times during the steeping process. The graph of this data in FIG. 2 shows the relationship between pH adjust steep times and it's impact on starch yields. It should be noted that the most effective point of pH adjustment occurred between 8 to 16 hours after the $SO_2$ water is introduced to the steeping process with a second adjustment made 1 hour before the movement of the water to the incubation tank.

TABLE I

| | Starch Yield in % by Weight of Corn | | | | |
|---|---|---|---|---|---|
| Steep Time (Hours*) | (Control) 0 hours | 8 hours | 12 hours | 16 hours | 18 hours |
| 12 | — | 59.48 | 62.31 | 61.37 | — |
| 16 | 59.46 | 62.25 | 64.92 | 63.93 | 62.56 |
| 20 | 63.21 | 62.18 | 66.18 | 64.64 | 62.93 |
| 24 | 64.60 | 64.63 | 67.01 | 65.16 | 60.83 |
| 28 | 65.95 | — | 68.15 | — | — |

*Time after the $SO_2$ water is introduced to steeps.

EXAMPLE 2

One-gallon samples were obtained from the final steepwater draw from A-Battery while pH adjustments were occurring 8 hours after $SO_2$ water was introduced to the steeps. 200 mL aliquots were taken from the samples and pH adjusted to 4.9 to 5.0 and incubated at various temperatures ranging from 110 degrees F. to 131 degrees F. in the lab. Reducing sugar content was tested during incubation using the Corn Industries Research Foundation Division of Corn Refiners Association, Inc. Standard Analytical Method. Sixth Edition. D-52, J-58. Washington. This method measures percent by weight d.s. (dry substance) of reducing sugars in the samples.

Figure 3:
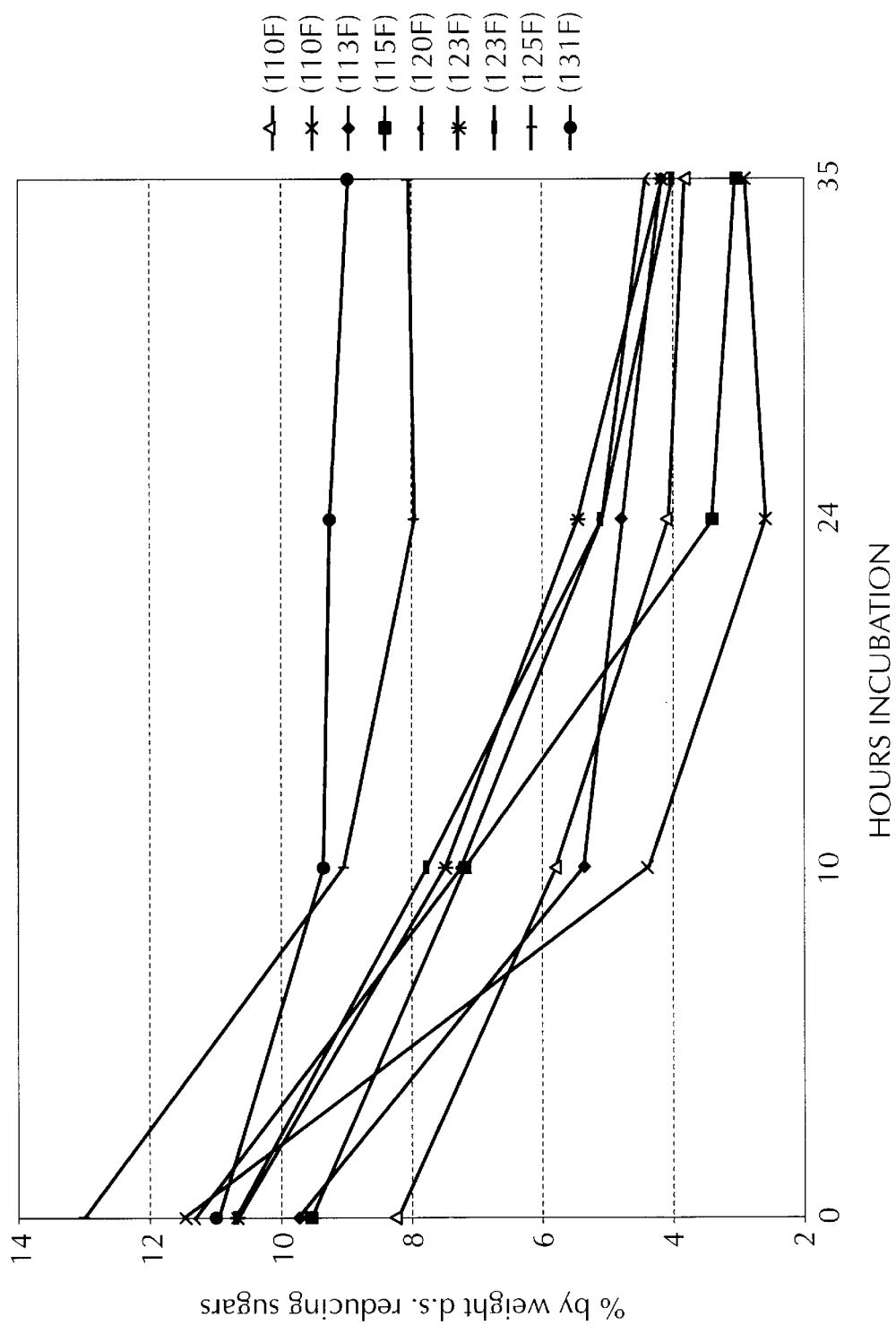
FIG. 3 is a chart of curves showing incubation at different temperatures.

Results shown in FIG. 3 indicate the reduction of the reducing sugars in the steepwater during the duration of incubation cycle. Samples maintained at or lower than 115 degrees F during incubation began to exhibit sensory attributes of alcohol fermentation, which is detrimental to the process of producing fermentation grade steepwater. In addition, results of incubation temperatures above 123 degrees F. showed that a sufficient reduction in reducing sugars was not achieved. Therefore, the optimum temperature limits based on these results for reducing the amount of reducing sugars in steepwater during incubation would be from about 118 to about 123 degrees F.

EXAMPLE 3

Figure 4:
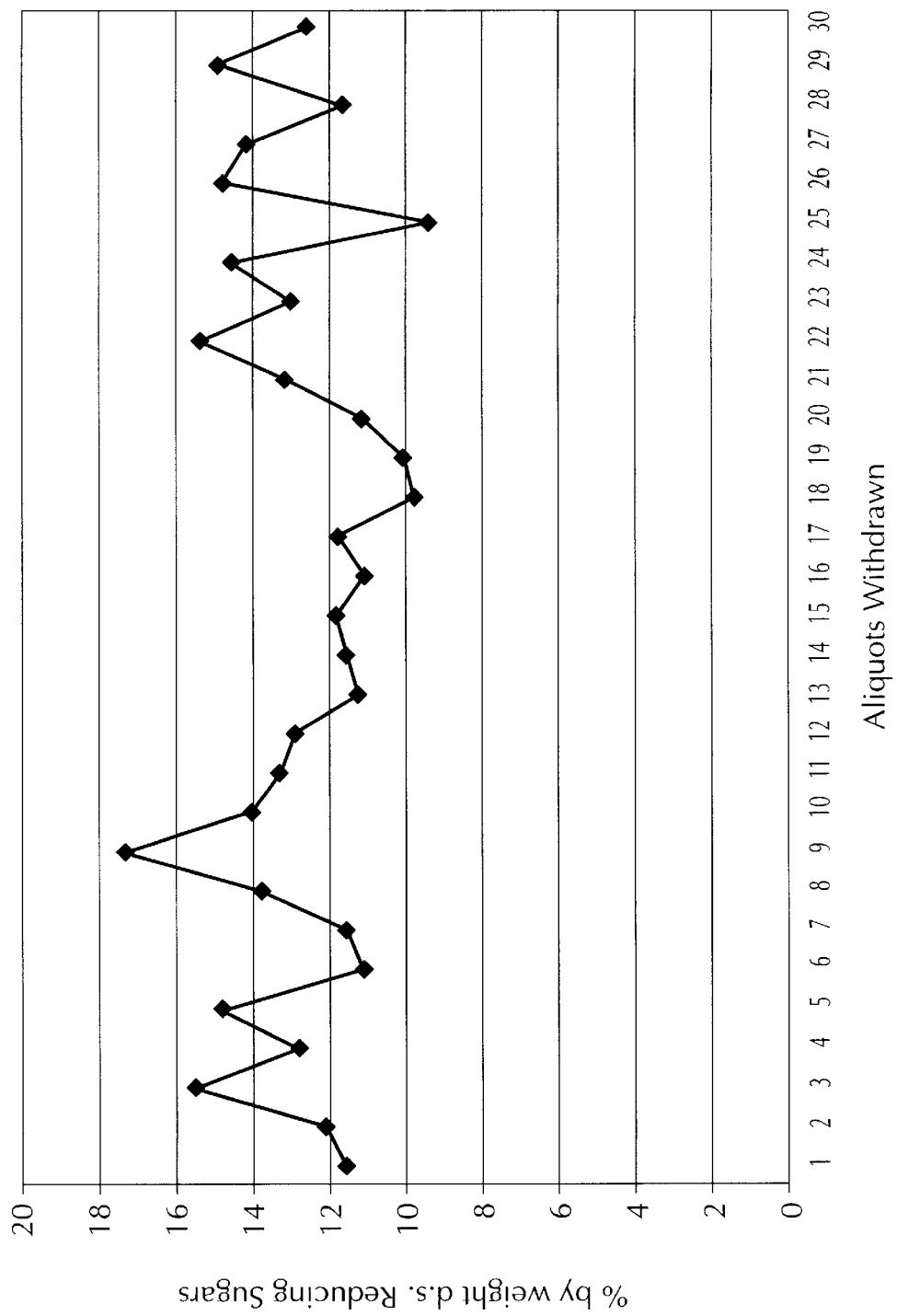
FIGS. 4 and 5 are graphs showing percent reducing sugars in steepwater in the incubation tanks before and after pH adjustments in the steeps.
Figure 5:
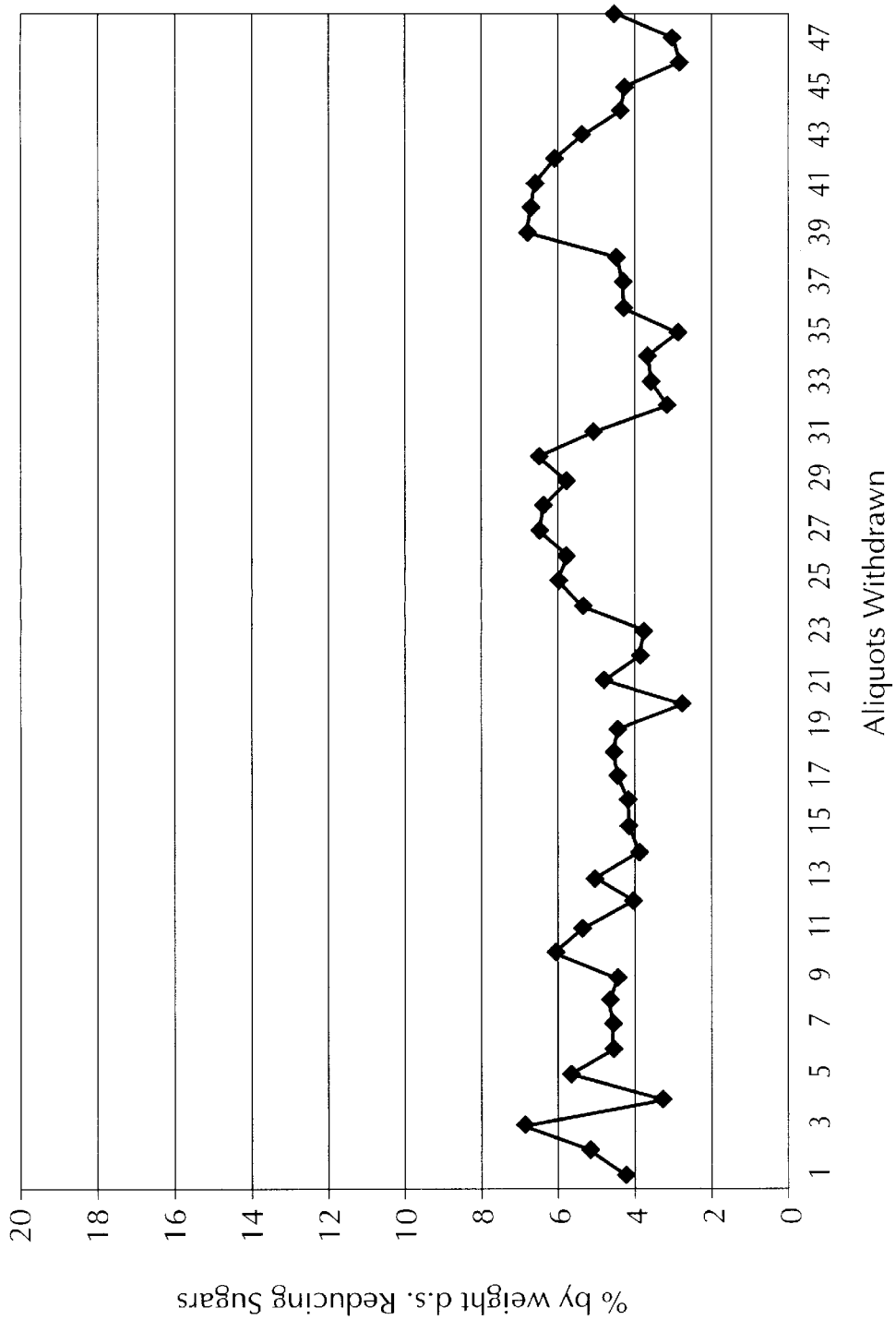

Additional reducing sugars tests were performed in the process to confirm lab data. Table II and FIG. 4 indicate resulting data of actual reducing sugars content before any pH adjusting occurred in the actual steeping process. Aliquots were withdrawn over a period of 3 months and 6 days. Consistently the percentage by weight d.s. reducing sugars was above 10 percent and averaged above 12 percent. These levels are well above the acceptable levels generally required for effective fermentation media. Table III and FIG. 5 indicate the actual percent reducing sugars after pH adjustment to 4.5–4.8 pH were made in the steep process 8–16 hours after the $SO_2$ water is introduced and with a second pH adjustment made to the steepwater 1 hour before movement of the water to incubation. Steepwater temperatures in all processes were 118–123 degrees F. Aliquots were withdrawn over a period of 5 months. The results indicate that the steepwater had a reducing sugars content of an average below 5 percent by weight d.s.

TABLE II

Incubation Tank #3 Before pH Adjustment in the Steeps

| Day | % DE | Draw/Bu. | SO$_2$ |
|---|---|---|---|
| 1 | 11.6 | 2.64 | |
| 2 | 12.1 | 2.4 | |
| 3 | 15.5 | 2.99 | |
| 4 | 12.8 | 2.52 | |
| 5 | 14.8 | 2.16 | |
| 6 | 11.1 | 1.76 | |
| 7 | 11.6 | 2.26 | |
| 8 | 13.8 | 2.13 | |
| 9 | 17.3 | 1.88 | |
| 10 | 14 | 2.67 | |
| 11 | 13.3 | 3.32 | |
| 12 | 12.9 | 2.9 | 1500 |
| 13 | 11.3 | 3.03 | 1300 |
| 14 | 11.6 | 2.86 | 1550 |
| 15 | 11.8 | 2.96 | 1243 |
| 16 | 11.1 | 2.42 | 1526 |
| 17 | 11.8 | 2.4 | 1424 |
| 18 | 9.8 | 1.83 | 1475 |
| 19 | 10.1 | 1.85 | 1340 |
| 20 | 11.2 | 2 | 1425 |
| 21 | 13.2 | 2.72 | 1285 |
| 22 | 15.4 | 1.92 | 1281 |
| 23 | 13 | 2.55 | 1490 |
| 24 | 14.6 | 2.53 | 1450 |
| 25 | 9.4 | 1.62 | 1700 |
| 26 | 14.8 | 2.72 | 1900 |
| 27 | 14.2 | 2.38 | 1694 |
| 28 | 11.6 | 2.17 | 1725 |
| 29 | 14.9 | 2.51 | |
| 30 | 12.6 | 2.41 | |
| Average | 12.77 | 2.42 | 1488.71 |

TABLE III

Incubation Tank #3 After pH Adjustment in the Steeps

| Day | % DE | Draw/Bu. | SO$_2$ |
|---|---|---|---|
| 1 | 4.3 | 3 | 1255 |
| 2 | 5.2 | 3.19 | 1540 |
| 3 | 6.9 | 2.85 | 1615 |
| 4 | 3.3 | 3.41 | 1727 |
| 5 | 5.7 | 3.4 | 1600 |
| 6 | 4.6 | 2.8 | 1588 |
| 7 | 4.6 | 2.45 | 1841 |
| 8 | 4.7 | 2.88 | 1891 |
| 9 | 4.5 | 2.62 | 1620 |
| 10 | 6.1 | 2.8 | 1050 |
| 11 | 5.4 | 3.2 | 1534 |
| 12 | 4.1 | 3.5 | 1520 |
| 13 | 5.1 | 2.43 | 1554 |
| 14 | 3.9 | 2.35 | 1555 |
| 15 | 4.2 | 2.69 | 1546 |
| 16 | 4.2 | 2.2 | 1394 |
| 17 | 4.5 | 2.9 | 1416 |
| 18 | 4.6 | 2.8 | 1610 |
| 19 | 4.5 | 2.7 | 1285 |
| 20 | 2.8 | 2.98 | 1522 |
| 21 | 4.8 | 2.43 | 1296 |
| 22 | 3.9 | 2.78 | 1560 |
| 23 | 3.8 | 2.86 | 1400 |
| 24 | 5.4 | 2.79 | 1462 |
| 25 | 6 | 2.7 | 1638 |
| 26 | 5.8 | 2.43 | 1730 |
| 27 | 6.5 | 2.14 | 1650 |
| 28 | 6.4 | 2.59 | 1736 |
| 29 | 5.8 | 2.56 | 1784 |
| 30 | 6.5 | 2.9 | 1006 |
| 31 | 5.1 | 2.46 | 1140 |
| 32 | 3.2 | 3.12 | 1186 |
| 33 | 3.6 | 2.28 | 1300 |
| 34 | 3.7 | 2.33 | 1280 |
| 35 | 2.9 | 2.54 | 1244 |
| 36 | 4.3 | 2.41 | 1128 |
| 37 | 4.3 | 2.36 | 1670 |
| 38 | 4.5 | 2.43 | 1650 |
| 39 | 6.8 | 2.56 | 1829 |
| 40 | 6.7 | 2.88 | 1700 |
| 41 | 6.6 | 2.13 | 1735 |
| 42 | 6.1 | 2.47 | 1720 |
| 43 | 5.4 | 2.37 | 1680 |
| 44 | 4.4 | 2.45 | 1850 |
| 45 | 4.3 | 2.18 | 1600 |
| 46 | 2.9 | 2.42 | 1300 |
| 47 | 3.1 | 2.47 | 1350 |
| 48 | 4.6 | 2.13 | 1400 |
| Average | 4.80 | 2.65 | 1513.69 |

What is claimed is:

1. A corn steeping process for producing corn steepwater having low reducing sugar content comprising (a) introducing fresh steepwater containing from about 1000 to about 2200 parts per million sulfur dioxide to corn;

(b) steeping the corn for a steeping time greater than 10 hours at a temperature from about 118° F. to about 125° F.;

(c) separating the steepwater from the corn at a rate of 2 to 4 gallons per bushel of corn;

(d) adjusting the pH to from about 4.2 to about 5.5 at a time between about 4 hours after the fresh steepwater is introduced to about 1 hour before the separation of the steepwater from the corn;

(e) maintaining the separated steepwater at a temperature from about 118° F. to about 125 ° F. for between about 10 to about 40 hours; and (f) evaporating the corn steepwater.

2. The process of claim 1 wherein the pH is adjusted at a time between about 8 hours and about 16 hours after the fresh steepwater is introduced.

3. The process of claim 1 wherein the steepwater is withdrawn from the process prior to adjusting the pH, the pH is adjusted and the steepwater having an adjusted pH is returned to the process.

4. The process of claim 3 wherein the pH is adjusted at a time between about 8 hours and about 16 hours after the fresh steepwater is introduced.

5. The process of claim 1 wherein the corn is steeped for a steeping time between about 20 to about 48 hours.

6. The process of claim 5 wherein the pH is adjusted at a time between about 8 hours and about 16 hours after the fresh steepwater is introduced.

7. The process of claim 5 wherein the steepwater is withdrawn from the process prior to adjusting the pH, the pH is adjusted and the steepwater having an adjusted pH is returned to the process.

8. The process of claim 7 wherein the pH is adjusted at a time between about 8 hours and about 16 hours after the fresh steepwater is introduced.

* * * * *